F. W. COTTERMAN.
GEARING.
APPLICATION FILED JUNE 21, 1916.
1,279,659. Patented Sept. 24, 1918.
4 SHEETS—SHEET 1.
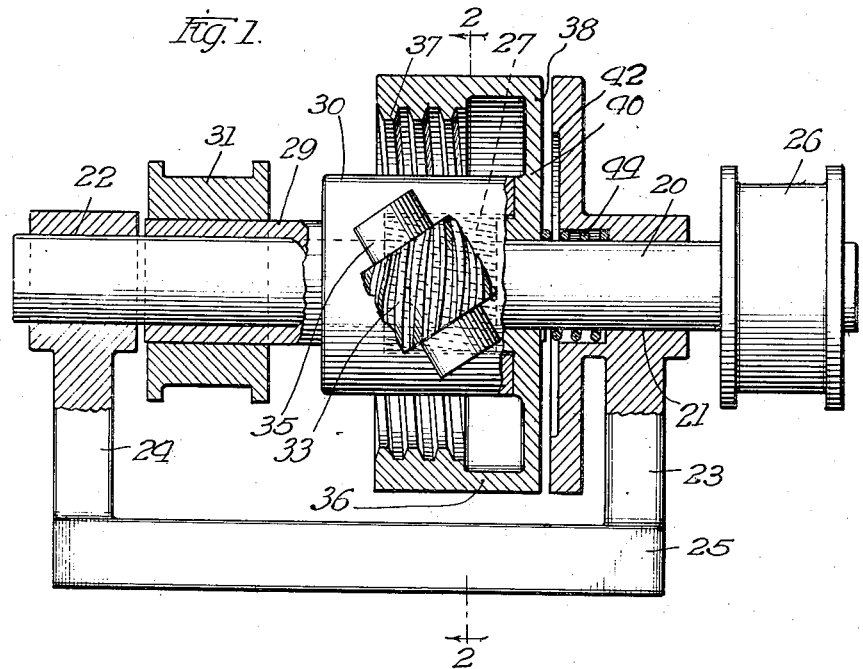
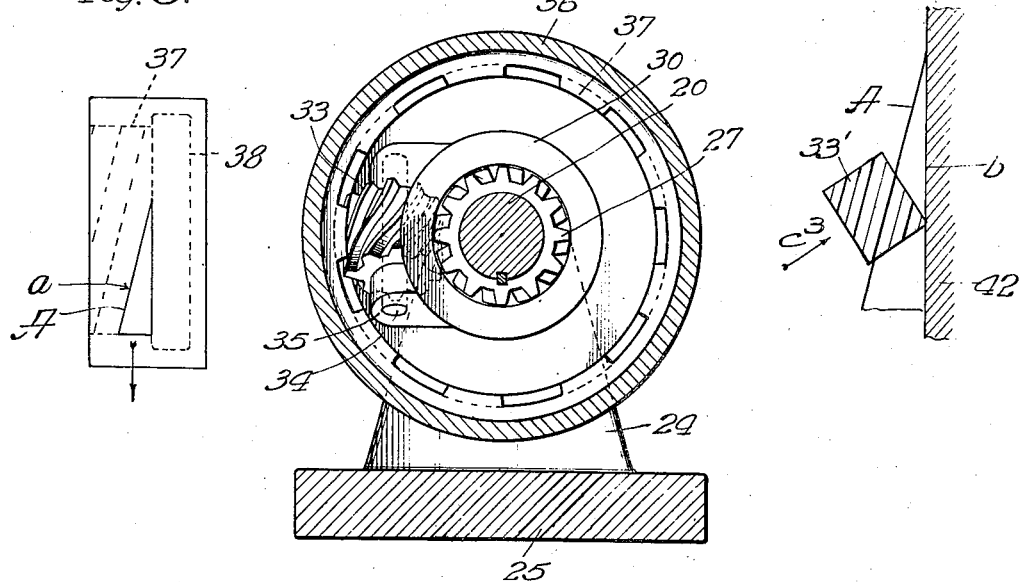
Witnesses
Robert H. Weir
Arthur W. Carlson
Inventor
Frederick W. Cotterman
By Toulin Bain + May
Attys.

F. W. COTTERMAN.
GEARING.
APPLICATION FILED JUNE 21, 1916.

1,279,659.

Patented Sept. 24, 1918.
4 SHEETS—SHEET 2.

Witnesses:
Robert H. Weir
Arthur W. Carlson

Inventor
Frederick W. Cotterman
By Fowler Bain & May
Attys.

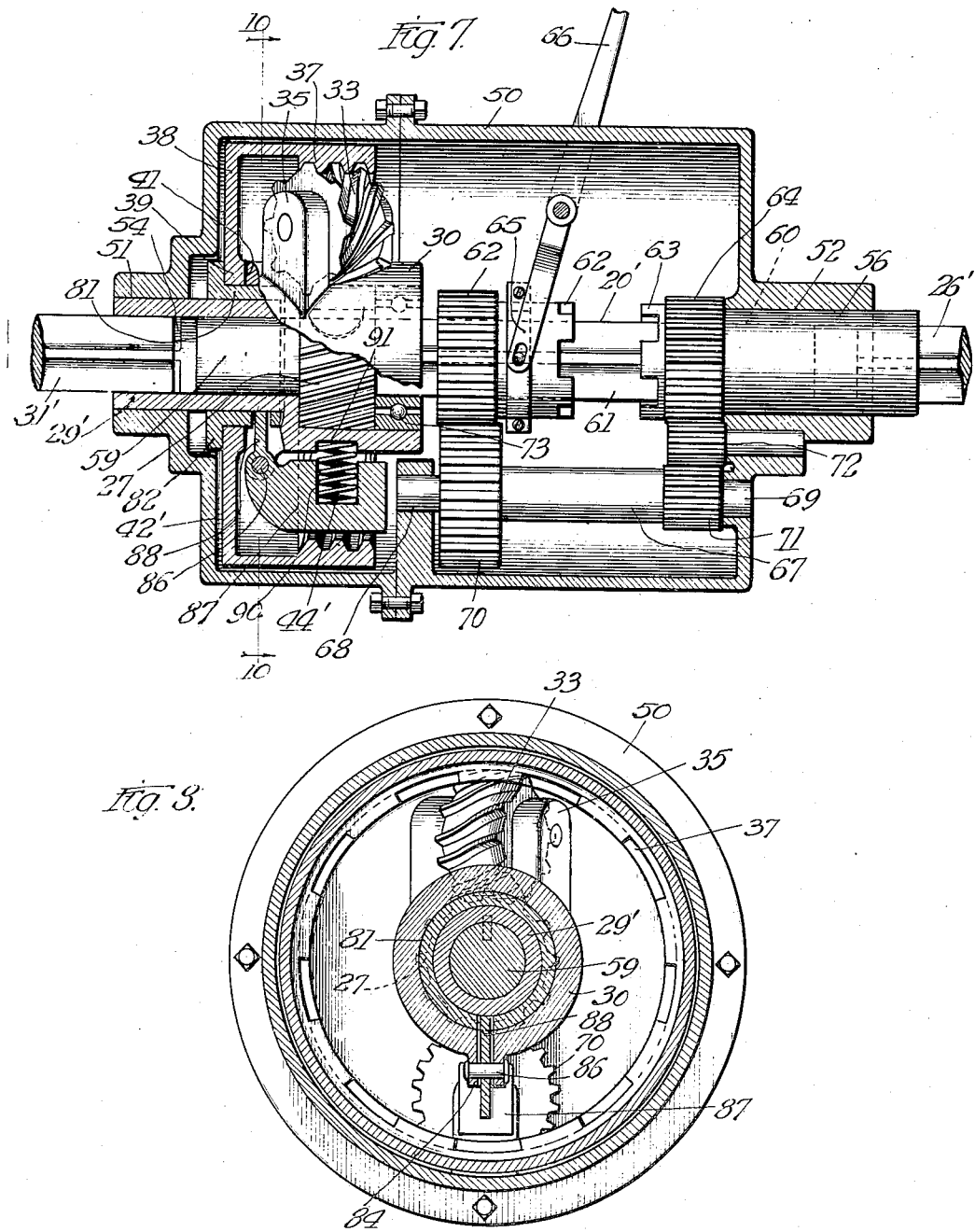

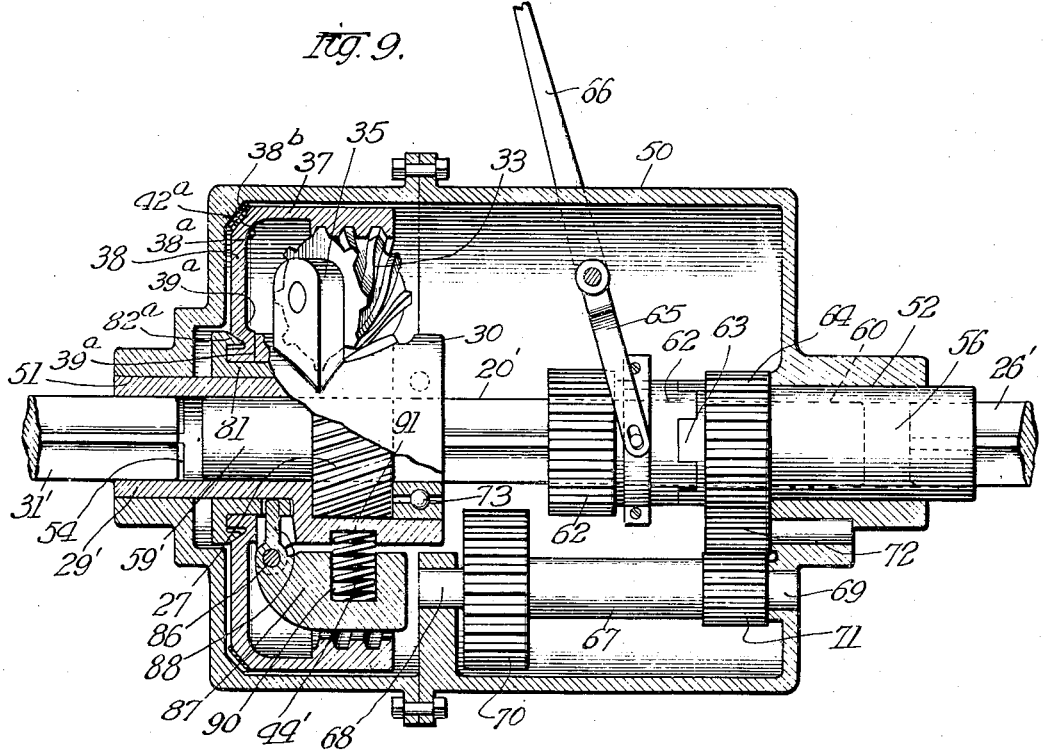

UNITED STATES PATENT OFFICE.

FREDERICK W. COTTERMAN, OF DAYTON, OHIO, ASSIGNOR OF ONE-HALF TO VINCENT G. APPLE, OF DAYTON, OHIO.

GEARING.

1,279,659.  Specification of Letters Patent.  Patented Sept. 24, 1918.

Application filed June 21, 1916. Serial No. 104,857.

*To all whom it may concern:*

Be it known that I, FREDERICK W. COTTERMAN, a citizen of the United States, residing at Dayton, in the county of Montgomery and State of Ohio, have invented certain new and useful Improvements in Gearing, of which the following is a specification.

This invention relates to improvements in power transmitting gearing and particularly to a transmission in which either a reduction in speed ratio or a direct one-to-one drive may be utilized, depending upon the conditions under which the gearing operates, the change in speed ratio of the driving and driven parts being automatically effected. The automatic effectuation of the change in speed ratio may be responsive to any desired variable factor such for example as speed, torque, or direction of drive, or it may be responsive to any combination of such factors.

More specifically my apparatus comprises a form of planetary gearing in which one of the parts is arranged to be automatically stopped from rotation to permit the use of the apparatus as a reduced-speed power transmitter or all of the parts may be rotated as a unit giving a direct drive.

The applications of such a form of gearing to commercial uses are many. For example, its use in the transmission of power from the engine of an automobile to the rear wheels thereof eliminates the necessity of manual gear shifting, the gearing automatically changing to give a speed reduction or "low gear" when the driving conditions are such as to necessitate its use.

A particular object of the invention is, therefore, to provide a power transmitting gearing in which automatic variation of speed ratio between the driving member and the driven member is effected either by the reversal in direction of drive, or by the variation of a selected factor, such for example as speed or torque.

Other and further objects will become apparent to those skilled in the art from a consideration of the following description and drawings, wherein I have illustrated several embodiments of my invention for the purpose of a clear disclosure;

Figure 1 is a vertical longitudinal sectional view through a simple form of transmission embodying my improved gearing.

Fig. 2 is a transverse sectional view on the line 2—2 of Fig. 1.

Fig. 4 is a perspective view of the gear carrier and pulley detached from the gearing illustrated in Fig. 1.

Figs. 5 and 6 are diagrammatic illustrations of the application of forces in my improved gearing.

Fig. 7 is a horizontal sectional view illustrating my improved gearing as applied to the transmission of an automobile.

Fig. 8 is a transverse sectional view on the line 10—10 of Fig. 7.

Fig. 9 is a horizontal sectional view through a form of gearing similar to that illustrated in Fig. 7 with modified friction surfaces.

Fig. 10 is a detached perspective view of the pinion carrier shown in Fig. 7.

Fig. 11 is a detached perspective view of the centrifugal weight as employed in the transmission shown in Fig. 7; and, Fig. 12 is a detached perspective view of the friction collar as employed in the transmission illustrated in Fig. 7.

Figure 3:
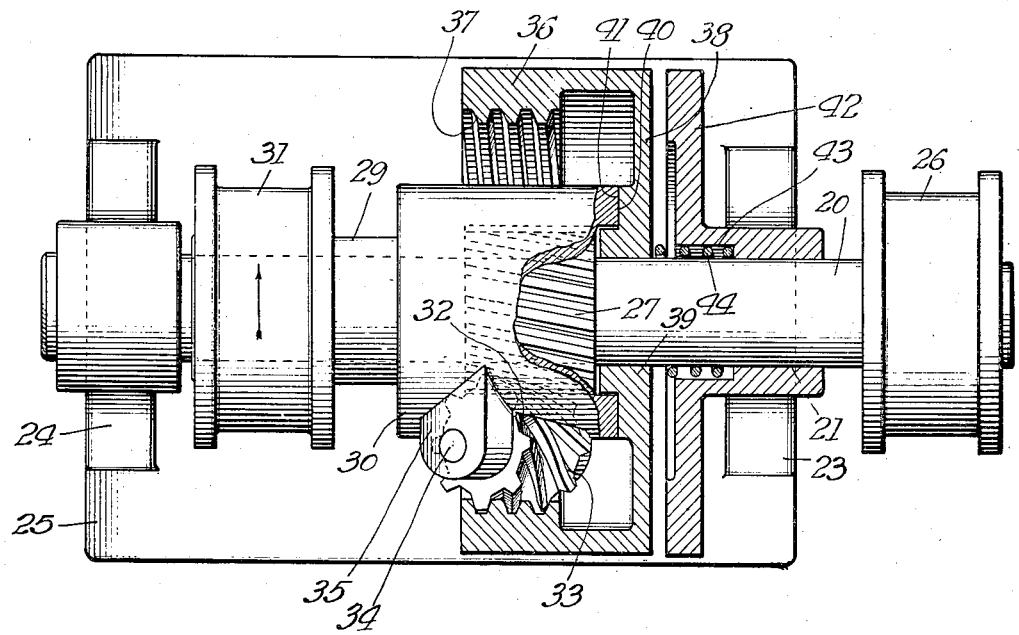
Fig. 3 is a plan view of the gearing shown in Fig. 1, with parts broken away.

In the drawings I have illustrated the application of my invention to two different types of transmissions, Figs. 1 to 4 showing a simple form of gearing for transmitting power from one drive pulley to another, whereas Figs. 7 to 12 inclusive show a practical application of my invention to the transmission gearing of an automobile.

Figure 6:
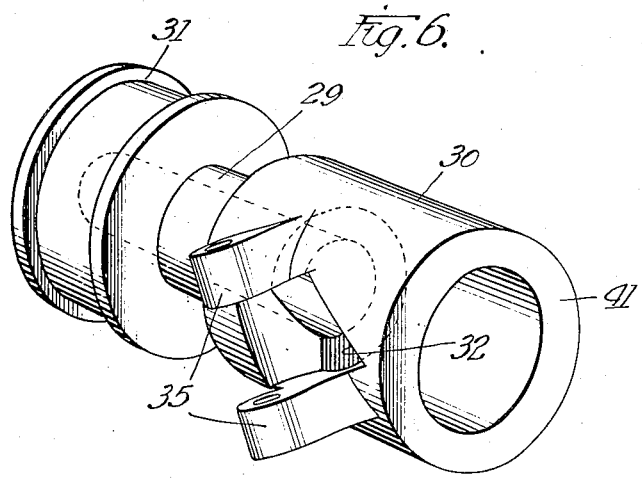

In order that a clear understanding may be had of the operation of my gearing I will first describe the simplified form shown in Figs. 1 to 4 with reference to the diagrams Figs. 5 and 6 that are supplied to make clear the explanation of the principles involved.

Structurally the power transmission shown in Figs. 1 to 4 is extremely simple and comprises but few parts. A shaft 20 is journaled at its opposite ends in bearings 21—22 carried in the upper ends of the arms 23—24, which project from the base 25. Secured on the right hand end of the shaft 20 is a pulley 26 which we will term the "driven pulley." A gear 27 is secured to the shaft between the bearings 21 and 22. Freely rotatable upon the shaft 20 and mounted at the left of the gear 27 is a sleeve 29 which is expanded into a hollow shell 30 that houses the gear 27. A drive pulley 31 is secured to this sleeve 29. An opening 32 is cut through the periphery of the shell 30 to receive a pinion 33, which is journaled upon a stub shaft 34 secured at opposite ends in the lugs 35 formed integral with the shell 30, said pinion 33 meshing with the gear 27. The axis of pinion 33 is inclined considerably to the axis of gear 27, and the teeth mesh on lines, running in the general direction of the shaft 20. Surrounding the hub or pinion carrier 30 is a cup shaped member 36 having an internal gear 37 formed therein and positioned to mesh with the pinion 33, the teeth meshing on lines generally transverse to shaft 20, or nearly at right angles to the teeth of gear 27. The base or bottom part 38 of cup member 36 extends inwardly to a hub 39 journaled on shaft 20, the hub having a shoulder 40 for frictional or clutch engagement with the end surface 41 of pinion carrier 30. Opposing the face 38 of the internal gear member is a stationary disk 42 which may be integral with the supporting arm 23 of the standard. This portion of the standard is counter-bored as at 43, to receive the coiled spring 44, the free end of which presses against the internal gear member 36 tending to force the friction surfaces 40 and 41 into engagement.

Bearing in mind the directions of application of forces resulting from the disposition of the inclined pinion 33 between the longitudinally-toothed shaft-gear 27 and the transversely-toothed internal gear 37, the action of the device in the simple form now under consideration may easily be understood, but such understanding is facilitated by the assumption of some definite relative sizes of parts for purpose of specific example.

Therefore, only by way of arithmetical example and without intent to limit the invention to the figures so selected, I will assume for the several gear parts the following proportions:

Let shaft gear 27 be illustratively a one inch gear with twelve teeth; pinion 33 nearly the same diameter, with eight teeth, and internal gear 37 approximately three inches in diameter with nine teeth. Under such proportioning the gear-reduction that is obtained under certain conditions is one-to-four, that is to say, pulley 26 will be rotated once to four revolutions of pulley 31. This reduction ratio results from holding the internal gear against rotation while rotating the carrier 30, with its pinion 33. In a single turn of carrier 30, the eight teeth of pinion 33 must coact with the nine teeth of the internal gear, or in other words pinion 33 must turn about its own axis one and one-eighth times. For the eight toothed pinion 33 to rotate one and one-eighth times in the course of a planetary revolution about the shaft gear 27, thereby bringing only nine teeth of the pinion into engagement with the twelve teeth of said gear 27, such gear 27 must be dragged or cammed forwardly three teeth, or one-fourth of a rotation, carrying shaft 20 and pulley 26 one-fourth of a rotation in the same direction that pulley 31 is turned.

In acting as a reduction gear, the shell 38 abuts against fixed disk 42, and has no turning movement. Under other circumstances the said shell 38 has its surface 40 clutched to the end surface of sleeve 30 and pinion 33 then acts merely as a connector or lock-device between gears 27 and 37, so that shell 30, pinion 33 and gears 27 and 37 all rotate in unison, and shaft 20 is driven one-to-one with pulley 31.

The vital change of condition, namely transference of the base 38 of the internal-gear shell from position for coöperation with carrier-shell 30 (for one-to-one operation of the driving and driven elements) into position for coöperation with the fixed disk 42 (to bring into play the four-to-one gear-reduction) may be effected in response to various predetermined factors. In the simple arrangement first illustrated where spring 44 normally holds the internal-gear cup 38 in engagement with the shell 30 and yields to permit said internal-gear cup to engage the fixed disk 42, the factor controlling the shift from direct drive, or one-to-one ratio, to reduction drive, or four-to-one ratio, is torque. If the torque required to rotate the shaft 20 is high enough, spring 44 will yield, internal gear 37 will shift axially to the right bringing the cup-base 38 into contact with disk 42 and the gear-reduction-operation takes place. When the torque required to rotate the shaft 20 is less, the spring 44 holds the cup-base 38 engaged with shell 30 and the one-to-one driving relation is maintained.

To make the operation, that is generally stated above, clear, I will further particularize by way of specific assumptions for illustrative purposes. It is obvious that if some resistance to movement of shaft 20 exists and pinion-carrier 30 is rotated forwardly (clockwise in Fig. 2) pinion 33 will tend to "planet" about the shaft gear 37, rotating forwardly on its own axis one and a half rotations to its planetary revolution. Also that since twelve teeth of pinion 33 must coact with the nine teeth of internal gear 37 in the course of such revolution, the internal gear must either turn backward, (counter-clockwise in Fig. 2) or shift axially to the right (Fig. 1). In effect the gear 37 may only move axially, for a very slight resistance will suffice to hold it against backward rotation, as the following considerations will make clear:

Preliminarily, it is a well known fact that if the spiral angle of a worm be small enough the worm wheel will not revolve the worm, nor will a force, however great, pushing on the end of a nut turn the screw if the lead of the screw be small enough; nor will a wedge of small angle move from under a weight, however great, if the angle of the wedge be sharp enough. These truisms should be borne in mind in considering the action of internal gear 37 under force applied by pinion 33. Assuming now that the spiral angle of the gear teeth 37 to a vertical plane is approximately fourteen degrees and considering, for illustrative purposes, that the section of a tooth of said gear 37 acted upon by a tooth of pinion 33 constitutes in effect a wedge (a) in Fig. 5: If the internal gear 37 is to be rotated backward by pinion 33 it will be necessary that the force pressing against the surface A of the "wedge" a be great enough to cause said wedge to slip out from under the member applying the force and to move in the direction indicated by the arrow (Fig. 5). Referring to Fig. 4 it is evident that in turning on its own axis the pinion tooth exerts a thrust on the line of arrow $c^3$, at an angle of about 34° to the axis of the gear 37 and about 42° to the surface of the internal-gear tooth. Consequently the tendency of a to slip backwardly is very slight, and will be insufficient to overcome any material resistance. Therefore gear 37 tends rather to be displaced axially than to be rotated backwardly, and as soon as contact between disk 42 and cupbase 38 is established, as at surface b (see Fig. 4) gear 37 becomes in effect rigidly locked, and therefore shaft 20 must turn one-to-four in order that the driving pulley 31 may rotate at all.

If, however, the resistance offered by spring 44 to axial displacement of the internal gear is such that greater torque applied to carrier 30 would be needed to displace the internal gear axially, than is required to rotate shaft 20, then the pinion 33, locking the two gears 27 and 37 together, and also the friction grip between surfaces 40 and 41, will serve to rotate the affected parts in unison.

It is therefore clear that by suitably proportioning of the strength of spring 44, the structure may be made to operate as a one-to-one driving gear, automatically changing to a four-to-one gear upon requirement for a torque in excess of a predetermined amount.

Incidentally, as described in my copending application, filed by me May 11th, 1916, entitled Gearing and serially numbered 96,796, the structure operates as a one-to-one gear if the pulley 26 be primarily driven forwardly and a one-to-four reduction if pulley 31 be the driver.

From the very nature of the device it is apparent that an automatic gearing of this nature has a wide range of applications, the gear ratio changing factor being selected for the particular conditions under which the device is to operate.

In certain associations, a single variable factor may be utilized, whereas in other environments the combinative effect of a number of factors may be utilized to effect the change in speed. Thus, for example, in the embodiment of the gearing in the transmission of an automobile, it appears that a gear shift responsive to either torque or speed alone would be unsatisfactory. If torque alone were depended upon for making the change it is evident that a certain point would have to be selected, above which the gearing would shift to "low." In such a case the higher powers which an engine might be capable of developing would be useless for driving the car at speed on level roads or up slight inclines where a one-to-one speed would not overwork the engine. On the other hand a speed change responsive to speed alone would make it impossible to use the engine for slow speed on a level road. The combinative effect of a torque responsive device, such as the coil spring 44, and a speed responsive device, such as a ball governor, gives a most useful combination for the operation of the gear shift of an automobile.

For the purpose of illustrating such an application of the invention to a well known type of mechanism, I have chosen the automobile transmission shown in Figs. 7 to 12.

The change speed gearing, in substantially the same form as previously described, is shown in Fig. 7 as occupying the left hand portion of the casing, the torque and speed responsive devices being incorporated therein, and a common type of transmission gearing providing so called "direct drive," "neutral" and "reverse" is positioned in the right hand portion of the casing. In describing this embodiment of the invention I will, where identity exists between certain parts and those heretofore described, use the same numerals, and will use the same numeral with a prime mark where a similarity exists between the functions performed. The casing 50 within which the gearing is mounted is provided at opposite ends with axially alining bearings 51 and 52, in the former of which is journaled a tubular shaft 29' enlarged at its inner end portion to provide a pinion carrier or hub 30. The inside of the tubular shaft 29' near its outer end is squared as at 54 to make slip connection with the squared driving shaft 31' which is connected with the engine, preferably through a suitable frictional clutch. Another short tubular shaft 56 is journaled in the bearing 52 at the opposite end of the casing, its outer end being internally squared to make slip connection with the squared propeller or driven shaft 26'. A stub shaft 20' has its opposite ends 59 and 60 journaled in the inner ends of the tubular shafts 29', 56. To provide for reversal in direction of drive as well as a disconnection between the driving and driven parts the intermediate portion of the shaft 58 is squared, as at 61, and carries an internally squared sliding pinion 62, one end of which is provided with positive clutch teeth 62 for sliding engagement with the clutch teeth 63 on pinion 64 carried by the inner end of the tubular shaft 56. Sliding of pinion 62 to the right upon the squared shaft 20', through the medium of the yoke 65 and lever 66, causes engagement of the two clutch surfaces 62, 63, giving a direct drive from shaft 20' to the driven or "propeller" shaft 26'. To permit a reversal in direction of drive from the driving shaft through to the driven shaft I have provided a counter-shaft 67 journaled at its opposite ends in the casing at 68 and 69 and carrying near its ends two gears 70 and 71. Gear 70 is adapted for engagement with sliding gear 62 when the same is moved into the position shown in Fig. 7, and the other gear 71 is at all times in mesh with an intermediate pinion 72 which in turn meshes with gear 64. As an additional support for the hub 30 I have interposed between its outer end and the shaft 20' an annular bearing 73.

The gearing arrangement is similar to that described in connection with the embodiments shown in Figs. 1 to 4 and comprises the gear 27 keyed to shaft 20', the pinion 33, journaled in the outwardly projecting lugs 35 of the hub (or pinion carrier 30) and the internal gear 37 with a radial supporting disk 38 adapted for frictional engagement with the end wall 42' of the casing 50. The hub 39 of the internal gear 37 is journaled on a collar 81 which is in turn journaled on the tubular stub shaft 29' and is provided at its outer end with a radially extending flange 82 adapted when drawn inwardly to press the hub 39 of the internal gear 37 into frictional engagement with the end surface 41 of the pinion carrier 30. A pair of ears 84 project from each side of the opening 85 in hub 30 and carry a pin 86 upon which is pivoted a weighted arm 87 carrying on its inner end a finger 88 which projects through the opening 85 and into a registering hole 89 in the collar 81. Outward movement of the weighted arm 87 consequently draws the collar 81 with its flange 82 inwardly pressing the internal gear hub 39 into tight engagement with the end surface 41 of the pinion carrier. The inner surface of the weighted arm 87 is provided with a pocket 90 in register with a similar pocket 91 formed on the pinion carrier 30 to receive a short coil spring 44' resiliently tending to separate the two parts and draw the internal gear hub 39 against the end surface 41 of pinion carrier 30.

As in the first described gearing a direct one to one drive will be obtained between shaft 31' and 26' when the hub 39 of the internal gear is pressed into frictional engagement with the surface 41 of the pinion carrier 30, the pinion 33 then serving as a lock or key between the hub and gear 27. When the conditions are such as to permit pinion 33 to cam the internal gear 37 axially to the left, pressing it into frictional engagement with the stationary wall 42' of the casing a planetary action will take place giving a four to one speed reduction.

The operation of the weighted arm 87 and coil spring 44' may best be understood from a detail description of the operation of a specific gear as applied to a motor car. In an effort to simplify the drawings I have shown but one planet pinion in each case though it is to be understood that a plurality, preferably three, are to be used when any considerable amount of power is to be transmitted, and in the automobile type of transmission three weights and springs would be desirable.

Assume a particular gas engine having a range of speed from 200 R. P. M. to 2000 R. P. M. and capable of delivering approximately 100 pounds torque. Let us for convenience, call the correct throttle opening for providing the maximum torque at any particular speed "full throttle". Consider now the use of spring 44' alone (disregarding the weight 87) as acting upon the end of a lever and consequently tending to draw the collar flange 82 inwardly and thus providing frictional engagement between the hub 39 of the internal gear and the end surface 41 of the pinion carrier 30. Choose a spring of such strength that it will yield sufficiently to cause a reduction in speed, that is, permit end movement of the internal gear to cause its frictional engagement with the casing, just before the "full throttle" 100 pound torque is overcome.

It is obvious that if the spring is of this strength the reduction of "low" gear will be non-operative whenever we attempt to run the car on level roads or slight hills, or in starting after a stop with a "half throttle" fifty pound torque since the engine would be overcome before the low gear took effect, and the reduction gear would be valueless except when running the engine at full power.

Now consider the spring as being weakened until it is overcome and the gear reduction comes into play just before the half throttle fifty pound torque of the engine is reached. It is now evident that whenever the operator attempts to race the car on high gear over a moderate hill which should be surmounted with a full throttle 100 pound torque without any reduction in gearing, the reduction gear becomes opera- tive just as soon as the half throttle fifty pound torque is reached, and thus renders the high powers of which the engine is capable, valueless.

From this it is apparent that a spring alone will not properly control the transmission.

Consider now the use of the weight 87 alone without any modification by the action of spring 44', it being remembered that the centrifugal force of a revolving body increases with the square of the number of revolutions. The action will be as follows:

Assuming that the weight will exert a 40 pound effort when the engine is running 400 R. P. M., and that the action of the weight tends to keep the gearing in "high" or one-to-one driving relation due to this forty pound effort exerted by the centrifugal action of the weight. On a level road and a "half throttle" fifty pound torque, which would be sufficient to pull the car on high gear, it is obvious that the forty pound weight action would yield to the fifty pound torque and cause the low gear to come into action. If a small hill was reached the half throttle fifty pound torque would pull the car up this small hill in low gear.

Supposing now that the car encounters one of the steepest grades which automobiles ever travel. Assuming that one thousand R. P. M. is the most effective engine speed, it will be necessary that the engine run at 1000 R. P. M. and also be in low gear to climb this hill. Of course the operator would throw on full throttle 100 pound torque. If the engine is now speeded up to 1000 R. P. M. the centrifugal action of the weight tending to keep in high gear would be increased from 40 pounds to 225 pounds, but the engine is now operating on full throttle which is only 100 pounds engine torque, which of course cannot overcome the 225 pounds exerted by the weights and bring into action the low gear. It follows that the low gear would not come into action until the speed of the engine was pulled down to about 600 R. P. M. at which time the force of the weights would be weakened sufficiently to be overcome by the 100 pound full throttle engine torque. At about 200 R. P. M. engine speed the weights would only exert about 9 pounds and the car would be operating with the lower gear in action at all times when the engine is running this slow. This obviously would be undesirable because on very level streets or slight down grades the 200 R. P. M. engine speed would pull the car on high gear and might be the speed at which the operator desired to travel, but could not, because the low gear would immediately become active and the car would run only at about two miles per hour instead of eight miles per hour, the desired speed. The engine would then have to be speeded up to bring the high gear into operation.

By combining the action of the centrifugally affected weight with a spring, both tending to hold the transmission in high gear, the following results can be obtained. Assuming the weight arm to exert approximately three pounds at 200 R. P. M. engine speed and the driving torque exerted by the engine at one-quarter throttle to be approximately twenty-five pounds, the centrifugal weight can then be assisted by a spring which will exert approximately twenty-three pounds tending to keep the gear in high, the 26 pounds exerted by the weight and spring overcoming the twenty-five pound engine torque until this speed is pulled down below 200 R. P. M. when the action of the weight will be decreased permitting the low gear to come into action until the former speed of 200 R. P. M. is again reached by the engine. Now running the engine at 1000 R. P. M. with full throttle 100 pound torque the weight pull will be seventy-five pounds added to the spring pull of twenty-three pounds, giving a total of ninety-eight pounds, or just enough to allow the 100 pounds torque full throttle to overcome it and throw in low gear should as much as 98 pounds torque be at any time required.

From the above it is, of course, obvious that whenever the engine reaches 1000 R. P. M. it does not follow that low gear will come into play. Very often on level roads running say 40 miles per hour on high the operator would never be close to going into low gear because the torque on level roads would in this case be far below the maximum pull of the engine, but it is only when the engine runs a certain speed and is doing its very best to maintain that speed, and is only bettering the torque which is dragging it back by a small margin that the low gear comes into action. The small margin referred to may be any amount of difference the designer thinks best.

Considering for example the extreme low speed of engine as 200 R. P. M. and the operator is running along on a smooth level road at 8 miles per hour. For the ordinary transmission the operator must watch the throttle if he comes to a slight incline or the engine will stall. With this automatic device the operator still has a four to one reduction waiting to help the weak, low throttle engine, up this slight raise. If the incline increases the operator must, of course, increase the fuel. If the incline is not too great, the operator may be able to raise the fuel until the car will go up on high gear, as raising the fuel raises the engine speed and increases the resistance of the mechanism going at a low gear.

Thus by combining weight and spring it is possible to obtain any combination of results to suit a particular condition.

Whereas in certain embodiments it is very probable that the frictional resistance of the plain metal surfaces will be sufficient to prevent relative movement of the internal gear either with respect to the rotating pinion carrier or with respect to the stationary end wall of the casing, in some embodiments it may be desirable to provide increased frictional resistance surfaces at these points. As illustrating a form which these frictional surfaces may take I have shown in Fig. 9, a transmission identical with that shown in Fig. 7 except for the frictional surfaces. In this embodiment the outer end of the internal gear 37 is beveled off to a frusto-conical form at 38$^a$ and covered with a friction material such as leather 38$^b$ for engagement with the corresponding conical surface 42$^a$ formed in the casing 50. A similar conical surface 82$^a$ is provided in place of the flange 82 on collar 81 for engagement with a corresponding conical surface 39$^a$ formed in the hub 39 of internal gear 37. These frictional surfaces may be inclined at any suitable angle to give the desired frictional grip.

Whereas in the drawings I have illustrated and described certain specific embodiments it is obvious that various changes may be made in the structure and arrangements of parts without departing from the spirit of the invention or the scope of the appended claims.

Having described my invention, what I claim is:

1. In a power transmitting device for automatic variation of a gear ratio from a driving element to a driven element, the driving element, the driven element, concentric separated gears with teeth disposed relatively angularly, one said gear constituting a driven gear connected with the driven-element, and the other said gear constituting a controlling gear, an interposed connecting gear, diagonally disposed for mesh with both concentric gears, mounted to be revolved with the driving element, and tending when so revolved to displace the two concentric gears in different directions, the tooth ratio providing for reduced-speed rotation of the driven gear when the controlling gear is held against displacement, means rendered effective by limited connecting-gear-effected displacement of said controlling gear to hold said controlling gear against further displacement, and means controlling the conditions requisite for such limited displacement of the controlling gear, said means normally holding the controlling gear in engagement with the driving element, whereby the several gear elements rotate in unison pending the displacement of the controlling gear and then the driven gear is rotated at reduced speed.

2. In a power transmitting device for automatic variation of gear ratio from a driving element to a driven element, the combination of a driving element, a driven element, concentric separated gears with teeth disposed relatively crosswise with respect to each other, the inner gear constituting a driven gear connected with the driven element, and the outer gear constituting a controlling gear, an interposed diagonally disposed connecting gear meshing with both concentric gears, mounted to be revolved with the driving element about the axis of the concentric gears and tending when so revolved to displace the two concentric gears in different directions the tooth ratio providing for reduced speed rotation of the inner gear when the outer gear is held against displacement, means rendered effective by limited connecting-gear effected displacement of the outer gear to hold the outer gear against further displacement, and means controlling the conditions requisite for such limited displacement of the outer gear, said means normally holding the outer gear in engagement with the driving element, whereby the several gear elements rotate in unison pending displacement of the outer gear and then the inner gear is rotated at reduced speed.

3. In a power transmitting device for automatic variation of gear ratio from a driving element to a driven element, the combination of a driving element, a driven element, concentric separated gears with teeth disposed relatively crosswise with respect to each other, the inner gear constituting a driven gear connected with the driven element, and having its teeth disposed generally axially and the outer gear constituting a controlling gear, and having its teeth disposed generally transverse to the axis, an integral diagonally disposed connecting gear meshing with both concentric gears, mounted to be revolved with the driving element about the axis of the concentric gears and tending when so revolved to displace the two concentric gears in different directions, the tooth ratio providing for reduced speed rotation of the inner gear when the outer gear is held against displacement, means rendered effective by limited connecting-gear effected displacement of the outer gear to hold the outer gear against further displacement, and means controlling the conditions requisite for such limited displacement of the outer gear, said means normally holding the outer gear in engagement with the driving element, whereby the several gear elements rotate in unison pending displacement of the outer gear and then the inner gear is rotated at reduced speed.

4. In a power transmitting device for automatic variation of gear ratio from a driving element to a driven element, the combination of a driving element, a driven element, concentric separated gears with teeth disposed relatively crosswise with respect to each other, the inner gear constituting a driven gear connected with the driven element, and having its teeth disposed generally axially, and the outer gear constituting a controlling gear, and having its teeth disposed generally transverse to the axis, an integral diagonally disposed connecting gear meshing with both concentric gears, mounted to be revolved with the driving element about the axis of the concentric gears and tending when so revolved to displace the two concentric gears in different directions, the tooth ratio providing for reduced speed rotation of the inner gear when the outer gear is held against displacement, means rendered effective by limited connecting-gear effected displacement of the outer gear to hold the outer gear against further displacement, and means responsive to variations of a predetermined variable factor for resisting such limited displacement of the outer gear, said means normally holding the outer gear in engagement with the driving element, whereby the several gear elements rotate in unison pending displacement of the outer gear and then the inner gear is rotated at reduced speed.

5. In a power transmitting device for automatic variation of a gear ratio from a driving element to a driven element, the combination of a driving element, a driven element, concentric separated gears with teeth disposed relatively crosswise with respect to each other, the inner gear constituting a driven gear connected with the driven element, and having its teeth disposed generally axially, and the outer gear constituting a controlling gear, and having its teeth disposed generally transverse to the axis, an integral diagonally disposed connecting gear meshing with both concentric gears, mounted to be revolved with the driving element about the axis of the concentric gears and tending when so revolved to displace the two concentric gears in different directions, the tooth ratio providing for reduced speed rotation of the inner gear when the outer gear is held against displacement; means rendered effective by limited connecting-gear effected displacement of the outer gear to hold the outer gear against further displacement, and resilient means resisting such limited displacement of the outer gear, said means normally holding the outer gear in engagement with the driving element, whereby the several gear elements rotate in unison pending displacement of the outer gear and then the inner gear is rotated at reduced speed.

6. In a power transmitting device of the character described, a driving element, an element to be driven, means normally connecting said elements for rotation in unison comprising a plurality of gears, and a resisting device, one said gear connected with the driving element, a second of said gears connected to the element to be driven, a third gear acting against the resisting device, the gear connected to the driving element tending to displace the second and third mentioned gears in different directions, and means to positively limit displacement of the last said gear after the resisting device is overcome whereby the first mentioned gear fulcruming on said third gear may rotate the second gear at reduced speed.

7. In a power transmitting device of the character described the combination of a driving element, an element to be driven, means normally connecting said elements for rotation in unison comprising three gears and a resisting device, one said gear connected with the driving element and tending to displace the other two gears in different directions, a second of said gears connected with the element to be driven and the third gear acting against the resisting device, and means to positively limit displacement of the last said gear after the resisting device is overcome, whereby the driving gear fulcruming on the displaced gear may rotate the driven gear at reduced speed.

8. The combination, in a power transmitting device, of substantially concentric non-meshing gears with teeth disposed relatively cross-wise, an interposed diagonally disposed connecting gear meshing with both said concentric gears, means for revolving said connecting gear bodily, means for limiting connecting-gear-impelled displacement of one of the concentric gears, and means for resisting the aforesaid displacement.

9. The combination, in a power transmitting device, of substantially concentric non-meshing gears with teeth disposed relatively cross-wise, an interposed diagonally disposed connecting gear meshing with both said concentric gears, means for revolving said connecting gear bodily, means for limiting connecting-gear-impelled displacement of one of the concentric gears, and means responsive to variations of a predetermined variable factor for resisting the aforesaid displacement.

10. The combination, in a power transmitting device, of substantially concentric non-meshing gears with teeth disposed relatively cross-wise, an interposed diagonally disposed connecting gear meshing with both said concentric gears, means for revolving said connecting gear bodily, means for limiting connecting-gear-impelled displacement of one of the concentric gears, and means responsive to changes in speed of the connecting gear revolving means for resisting the aforesaid displacement.

11. The combination, in a power transmitting device, of substantially concentric non-meshing gears with teeth disposed relatively cross-wise, an interposed diagonally disposed connecting gear meshing with both said concentric gears, means for revolving said connecting gear bodily, means for limiting connecting-gear-impelled displacement of one of the concentric gears, and means responsive to variations in the torque transmitted by the connecting gear revolving means for resisting the aforesaid displacement.

12. The combination, in a power transmitting device, of substantially concentric non-meshing gears with teeth disposed relatively cross-wise, an interposed diagonally disposed connecting gear meshing with both said concentric gears, means for revolving said connecting gear bodily, means for limiting connecting-gear-impelled displacement of one of the concentric gears, and means responsive to changes in the speed of and torque transmitted by the connecting gear revolving means for resisting the aforesaid displacement.

13. The combination in a power transmitting device, of internal and external substantially concentric non-meshing gears, the internal gear surrounding the other gear and having its teeth disposed generally transverse to the axis, the teeth of the other gear being generally axial, an interposed diagonally disposed connecting gear meshing with both said gears, means for revolving said connecting gear bodily about the axis of the other gears, stationary means for limiting connecting gear impelled axial displacement of the internal gear in one direction, means rotating with the connecting gear rotating means for limiting axial displacement of the internal gear in the opposite direction, and means for resisting axial movement of the internal gear toward the stationary limiting means.

14. The combination in a power transmitting device, of internal and external substantially concentric non-meshing gears, the internal gear surrounding the other gear and having its teeth disposed generally transverse to the axis, the teeth of the other gear being generally axial, an interposed diagonally disposed connecting gear meshing with both said gears, means for revolving said connecting gear bodily about the axis of the other gears, stationary means for limiting connecting gear impelled axial displacement of the internal gear in one direction, means rotating with the connecting gear rotating means for limiting axial displacement of the internal gear in the opposite direction, and means responsive to variations of a predetermined variable factor for resisting axial movement of the internal gear toward the stationary limiting means.

15. The combination in a power transmitting device, of internal and external substantially concentric non-meshing gears, the internal gear surrounding the other gear and having its teeth disposed generally transverse to the axis, the teeth of the other gear being generally axial, an interposed diagonally disposed connecting gear meshing with both said gears, means for revolving said connecting gear bodily about the axis of the other gears; stationary means for limiting connecting gear impelled axial displacement of the internal gear in one direction, means rotating with the connecting gear rotating means for limiting axial displacement of the internal gear in the opposite direction, and variable means responsive to changes in speed of the connecting gear rotating means for resisting axial movement of the internal gear toward the stationary limiting means.

16. The combination in a power transmitting device, of internal and external substantially concentric non-meshing gears, the internal gear surrounding the other gear and having its teeth disposed generally transverse to the axis, the teeth of the other gear being generally axial, an interposed diagonally disposed connecting gear meshing with both said gears, means for revolving said connecting gear bodily about the axis of the other gears; stationary means for limiting connecting gear impelled axial displacement of the internal gear in one direction, means rotating with the connecting gear rotating means for limiting axial displacement of the internal gear in the opposite direction, and variable means responsive to changes in torque transmitted by the connecting gear rotating means for resisting axial movement by the internal gear toward the stationary limiting means.

17. The combination in a power transmitting device, of internal and external substantially concentric non-meshing gears, the internal gear surrounding the other gear and having its teeth disposed generally transverse to the axis, the teeth of the other gear being generally axial, an interposed diagonally disposed connecting gear meshing with both said gears, means for revolving said connecting gear bodily about the axis of the other gears; stationary means for limiting connecting gear impelled axial displacement of the internal gear in one direction, means rotating with the connecting gear rotating means for limiting axial displacement of the internal gear in the opposite direction, and variable means responsive to changes in the speed of, and torque transmitted by the connecting gear rotating means for resisting axial movement of the internal gear toward the stationary limiting means.

18. The combination in a power transmission of axial alining driving and driven shafts, a pair of concentric non-meshing gears having their teeth disposed relatively crosswise, the teeth of one being generally axial, and the teeth of the other generally transverse to the axis, a diagonally disposed connecting gear meshing with both of the aforesaid gears and bodily rotatable by the driving shaft about the axis of the other gears, a driving connection between the driven shaft and the gear having its teeth disposed generally axial, stationary means for limiting, connecting gear impelled axial displacement of the gear having its teeth generally transverse to the axis, said last mentioned gear and stationary means having frictional abutting surfaces, means rotating with the driving shaft for limiting axial displacement of the last mentioned gear in the opposite direction, said last mentioned gear and rotating means having frictional abutting surfaces and means resiliently holding the last mentioned frictional surfaces in engagement.

19. The combination in a power transmission of axially alining driving and driven shafts, a spur gear connected with the driven shaft, an internal gear concentric with and surrounding the said gear, the teeth of said spur gear and internal gear being disposed relatively crosswise, the teeth of the spur gear being generally axial and those of the internal gear generally transverse to the axis, an interposed diagonally disposed connecting gear bodily rotatable by the driving shaft about the axis of the other gears, stationary means for limiting connecting gear impelled axial displacement of the internal gear in one direction, said internal gear and stationary means having frictional abutting surfaces, means rotating with the driving shaft for limiting axial displacement of the internal gear in the other direction, said rotating means and internal gear having frictional abutting surfaces, and means carried in rotation by the driving shaft resiliently holding the last mentioned frictional surfaces in engagement.

20. The combination with a power transmission of axially alining driving and driven shafts, a spur gear connected with the driven shaft, an internal gear concentric with and surrounding the said spur gear, the teeth of said spur gear and internal gear being disposed relatively cross wise, the teeth of the spur gear being generally axial and those of the internal gear generally transverse to the axis, a bored out hub surrounding the spur gear and connected with the driving shaft and having an opening extending through the periphery thereof, an interposed diagonally disposed connecting gear meshing with both of the aforesaid gears and journaled upon the said hub, its teeth projecting through the aforesaid opening into mesh with the spur gear, stationary means for limiting connecting gear impelled axial displacement of the internal gear in one direction, said internal gear and stationary means having frictional abutting surfaces, said hub and internal gear having frictional abutting surfaces limiting axial displacement of the internal gear in the opposite direction, and means carried by the said hub resiliently holding the last mentioned frictional surfaces in engagement.

21. The combination in a power transmitting device, of two independently rotatable shafts; a gear, connected with one shaft; a second gear axially movable in two directions; an intermediate gear, connecting the first and second gear and revoluble about the first mentioned gear; means coöperating with the said second gear when the latter is moved in one direction to compel rotation of said revoluble gear to cause one shaft to drive the other at one speed ratio, and means when said gear is moved in another direction to stop the rotation of said revoluble gear to drive the other shaft at another speed ratio.

22. The combination in a power transmitting device of two shafts; a gear connected with one shaft; a second gear bodily movable in two directions; a connecting gear revoluble about the first mentioned gear and connected with the other shaft; means coöperating with the said second gear, when the latter is bodily moved in one direction to stop rotation of said second gear and means, when said gear is moved in the opposite direction to lock said second gear with the connecting gear to prevent relative rotation thereof, whereby to change the speed relation of said shafts.

23. In combination with a power transmitting device, of two shafts; a gear connected with one shaft; a second gear axially movable in two directions; a connecting gear revoluble about the first mentioned gear and connected with the other shaft; means, coöperating with the second gear when moved in one direction to stop rotation of said gear and means, when said gear is moved in the other direction to compel rotation of the second gear with the connecting gear and means responsive to variations in torque stress transmitted, for affecting said coöperating means.

24. The combination in a power transmitting device of two coaxially arranged rotatable members, gearing associated with said members and adapted to connect the same for transmission of power at different speed ratios, means operable for effectuating the speed ratio changing of said gearing, and means responsive to variations in torque transmitted by the gearing for controlling the effectuating means.

25. The combination in a power transmission device of two coaxially arranged rotatable members, gearing associated with the said members and adapted to connect the same for transmission of power at different speed ratios, means operable for effectuating the speed ratio changing of said gearing, and means responsive to changes in the speed of, and torque transmitted by, said gearing for controlling the effectuating means.

26. The combination in a power transmitting device of a planetary gearing comprising a driving member, a driven member, and a control member, means responsive to changes in power transmitting conditions to lock the control member against rotation.

27. The combination in a power transmitting device of a planetary gearing comprising a driving member, a driven member, and a control member, means responsive to changes in power transmitting conditions to lock the control member against rotation, and means responsive to other changes in power transmitting conditions to cause coöperation of the control member with both the driving and driven members.

28. The combination in a power transmitting device of a planetary gearing comprising a gear, a pinion revoluble about the gear and a control gear, means responsive to variations in power transmitting conditions to lock the control gear against rotation.

29. In a device for transmitting power from a driving to a driven element, comprising a variable-speed gear-connection between said elements automatically responsive to a given torque resistance of the driven element to shift the gear relation, and means responsive to variable driving effort, of the driving element, for changing the point at which said torque resistance effects said gear shift so that the gear shift is effected always before the resisting torque is greater than the driving effort.

30. A two speed power transmitting device rotatable about a common axis comprising a driving element; a driven element; a speed changing connection between said elements normally adapted to maintain the driving and driven elements in relation to drive the driven elements at the high speed and means to automatically change the gear relation to drive the driven element at the low speed when the torque resistance of the driven element exceeds a predetermined value.

31. In a device rotatable about a common axis for transmitting power from a driving element to a driven element, at two speeds, a speed changing mechanism for connection between said elements, comprising a yielding torque-responsive means to maintain said elements in gear relation to drive the driven element at the high speed and means, operable when the torque resistance exceeds a predetermined value to change the gear relation whereby to drive the driven element at the low speed.

32. In a device for transmitting power from a driving element to a driven element, revoluble about a common axis, a speed changing mechanism for connection therebetween comprising a torque-responsive means to normally maintain said elements in gear relation to drive the driven element at relatively high speed and means, operable when the torque resistance exceeds a predetermined value to change the gear relation, whereby to drive the driven element at a lower speed.

33. A self contained speed changing mechanism comprising a driving element; a coaxially arranged driven element; a mechanism for connection between said elements consisting of a yielding torque-responsive means to maintain said elements in gear relation to drive the driven element at high speed; means, operable when the torque resistance exceeds a predetermined value to change the gear relation, whereby to drive the driven element at low speed and a relatively stationary casing inclosing said mechanism.

In testimony whereof I hereunto set my hand in the presence of two subscribing witnesses.

FREDERICK W. COTTERMAN.

In the presence of—
  MORRIS P. CROMER,
  EDITH PRATHER.